United States Patent [19]

Daugherty et al.

[11] 4,002,483

[45] Jan. 11, 1977

[54] EXPANSIVE CEMENT

[75] Inventors: Kenneth E. Daugherty, Lewisville; John P. Luker, Comanche; Joseph H. Allen, Irving, all of Tex.; Waldemar A. Klemm, Columbia, Md.

[73] Assignee: General Portland, Inc., Dallas, Tex.

[22] Filed: June 12, 1975

[21] Appl. No.: 586,225

[52] U.S. Cl. .................................. 106/89; 106/100
[51] Int. Cl.² .......................................... C04B 7/02
[58] Field of Search .............................. 106/89, 100

[56] References Cited

UNITED STATES PATENTS

| 2,032,347 | 3/1936 | Dahl et al. | 106/100 |
| 2,793,958 | 5/1957 | Hetzel | 106/100 |
| 2,904,445 | 9/1959 | Sellers et al. | 106/100 |
| 3,785,844 | 1/1974 | Kawano | 106/89 |
| 3,883,361 | 5/1975 | Pollitt et al. | 106/100 |
| 3,884,710 | 5/1975 | Allen et al. | 106/89 |

*Primary Examiner*—J. Poer
*Attorney, Agent, or Firm*—Richards, Harris and Medlock

[57] ABSTRACT

An improved expansive cement composition is provided which has the increased capability of being able to "grab" steel reinforcement members therewithin as the material is curing and expanding to result in effective stressing of the reinforcement members. This cement is made of particulate argillaceous and calcareous materials, and contains from about 1 to about 70% by weight of free CaO and from about 2 to about 7% by weight of MgO uniformly distributed therein, with the remaining portion being primarily tricalcium silicate and containing substantially no dicalcium silicate. The improved expansive composition can be manufactured by subjecting a conventional Portland cement raw mix, which has been "overlimed" and which contains the added quantity of MgO, to hard burning conditions within a Portland cement kiln such that the silicate materials are reacted with lime to form tricalcium silicate but yet leave from about 1 to about 70% by weight of the free CaO, and from about 2 to about 7% by weight of the MgO in the clinker, and thereafter comminuting the clinker. The composition can be used directly as an expansive cement, or can be mixed with other cements such as Portland cements to impart expansive qualities thereto.

36 Claims, No Drawings

EXPANSIVE CEMENT

BACKGROUND OF THE INVENTION

This invention relates to expansive cements. In another aspect, this invention relates to novel expansive compositions which have an improved ability to stress steel reinforcing members which are positioned within plastic concretes containing such compositions.

Portland cement concrete is one of the most widely used construction materials; however, it possesses the inherent characteristic of shrinkage on drying. This drying shrinkage can cause cracks in the resulting concrete. Cracks of varying size can generally be found in most reinforced concrete structures. In essence, when shrinkage of the curing concrete occurs, the concrete is placed under tension and if the tensile forces produced exceed the tensile strength of the material, a crack is produced.

As a consequence, expansive cements were developed so that concrete made from these cements would undergo a volumetric expansion during the curing cycle. The forces generated by this volumetric expansion of the concrete are harnessed in a manner that makes it possible to utilize these forces to control the cracking of the concrete caused by the drying shrinkage.

One technique for utilization of the volumetric expansion of concrete as a means of controlling cracking in the concrete is known as shrinkage compensation. This technique requires that the rate and amount of expansion in the concrete occur simultaneous with and in the same magnitude as the drying shrinkage. This balance of forces would eliminate the tensile stresses which normally give rise to cracking in concrete. In practice, such a match of expansion and drying shrinkage to achieve a nonshrinking or dimensionally stable concrete has been difficult to achieve and control as a great variety of materials and widely varying ambient conditions of temperature and relative humidity are encountered in concrete practice.

Another technique for utilization of volumetric expansion of concrete as a means of controlling cracking in concrete is to capture the force generated by the concrete expansion in reinforcing steel in such a manner that permits use of these forces to oppose the tensile stress generated by the drying shrinkage. This technique is referred to as stress induction. Reinforcing steel is placed in the fresh plastic concrete. During the setting reaction, the concrete forms a bond to or grabs the reinforcing steel. As the concrete expands, it carries the steel with it and thus creates a tensile stress in the steel. These tensile stresses in the reinforcing steel place the concrete under restraint and accordingly when expansion occurs, it is of a lesser magnitude and of a more controlled rate, and produces a stronger, denser concrete. This chemical stressing of the steel is analogous to mechanical prestressing of steel in concrete members in which a steel cable is placed and held in tension until the concrete has set and achieved a certain minimum strength. The cable is then released but within the concrete member it remains in a state of tension and places the concrete in compression.

In both cases, the tensile stresses within the steel reinforcement members exert compressive stresses on the concrete. The tensile stresses generated in concrete when drying shrinkage occurs are neutralized or balanced (because the concrete is in compression) until the magnitude of the drying shrinkage is greater than the magnitude of the tensile stresses of the steel reinforcement. It has been long assumed that as long as the measured expansion of the concrete exceeds any later drying shrinkage, the embedded steel reinforcement will maintain an overall state of compression within the concrete and no cracking will occur.

It has recently been found that all concrete expansion cannot be directly related to the induced tensile stresses within the reinforcing steel. It has been found that some slippage between the concrete and the steel occurs during expansion and therefore only a portion of the concrete expansion is utilized to stretch the steel.

For example, in a case where complete bonding occurs between the expansive concrete and the steel reinforcement bar, the measured expansion of the concrete is equal to the tensile strain on the steel. In this situation, the steel will keep the concrete in compression and for all amounts of drying shrinkage less than the maximum expansion prevent shrinkage cracking due to tensile forces set up by the decreasing volume. At the other extreme, if no bond occurs between the concrete and the steel, the steel bar remains slack and exerts no compressive stresses on the concrete. Subsequent drying shrinkage will place the concrete in tension and cause cracking. In this respect, the presence of the steel reinforcement contributes only to structural requirements and nothing to crack prevention.

In actual practice, expansive cement concrete will exhibit behaviors somewhere between these two extremes. Thus, there is needed an effective expansive cement whose degree of expansion can be easily controlled but yet will bond or grab steel reinforcement members more effectively such that a greater degree of concrete expansion can be directly related to the induced tensile stresses within the reinforcing member.

The earliest and most common type of expansive cements are the so called "Type K" compositions which are based upon a sulfoaluminate expansive mechanism. Examples of such compositions are disclosed in U.S. Pat. No. 3,251,701 and U.S. Pat. No. 3,303,037. The Type K expansive cements are produced by burning of a special clinker containing the proper amount of tetracalcium trialuminate sulfate ($C_4A_3\bar{S}$). It is noted in cement nomenclature that $C = CaO$; $S = SiO_2$; $A = Al_2O_3$; $F = Fe_2O_3$; and $\bar{S} = SO_3$. After hydration, this material generally forms ettringite and is accompanied by a concurrent increase in volume.

Another expansive cement composition based upon a sulfoaluminate expansion mechanism is the Type S expansive cement, which is a Portland cement containing a large amount of $C_3A$ and modified by an excess of calcium sulfate above the usual amount found in Portland cement. Still another conventional expansive cement is the "Type M" cement which is either a mixture of Portland cement, calcium aluminate cement, and calcium sulfate, or an interground product made from the above respective cement clinkers.

The above expansive cement compositions have met with only a limited success due to the fact that the amount and rate of expansion have been difficult to control within acceptable parameters. Furthermore, even when such cements have exhibited controllable expansion, the poor ability to bond to or grab reinforcing steel has prevented the successful placement of expansive cement concrete.

Recently, expansive cements have been developed based upon calcium oxide reactions. Such expansive cements typically are formed by burning a clinker of argillaceous and calcareous materials to a degree such that the silicate is in the form of $C_3S$ and substantially no $C_2S$ exists in the composition, and an excess of free uncombined calcium oxide exists in the composition together with the other components in the form of a liquid phase containing $C_4AF$ and $C_3A$. Compositions of this type are disclosed in U.S. Pat. No. 3,785,844 and copending patent application Ser. No. 404,934 filed Oct. 10, 1973, now U.S. Pat. No. 3,884,710. These expansive cements can be controlled to yield a wide range of expansion allowing them to be more effective than the sulfoaluminate cements for both shrinkage compensating and for stress inducing applications. However, even with this improved formulation, it was found that only a small percentage of the expansive potential was being used in concrete because of a partial bond to or grab of the reinforcing steel.

SHORT STATEMENT OF THE INVENTION

In accordance with the invention, it has been discovered that the addition of a minor but effective amount of MgO to a free lime expansive cement composition increases the ability of the composition when hydrating in a mortar paste or concrete mixture to stress steel reinforcement members therewithin. Thus, an improved expansive cement composition is provided which exhibits improved ability to stress steel reinforcement members during the expansion process which comprises an effective amount of a free CaO as the expansive agent (generally from about 1 to about 70% by weight of the composition), and an effective amount of MgO (generally from about 2 to about 7% by weight thereof) uniformly distributed within the composition for increasing the ability of the concrete to stress the reinforcing member, and wherein the silicate in the composition is predominantly in the form of $C_3S$ with substantially no $C_2S$.

According to one embodiment of the subject invention, the expansive cement composition of the subject invention is produced by a process which includes introducing an intimate mixture of argillaceous and calcareous reactant materials, and magnesia (magnesium oxide) containing material to the feed end of a kiln, said materials containing magnesium oxide in the range of from about 2 to about 7% by weight thereof and sufficient calcium oxide or materials which will form calcium oxide in situ, to fully stoichiometrically react with the remaining materials in the kiln and provide an excess of unreacted calcium oxide in the burned clinker in the range of from about 1 to about 70 weight percent thereof; and thereafter burning the reactant materials in a burning zone in the kiln for a sufficient time and temperature to completely react the silicate material with calcium oxide such that substantially all of the silicate is present in the form of tricalcium silicate and the composition contains substantially no dicalcium silicate, and thereafter grinding the clinker to produce an expansive cement composition.

According to still another embodiment of the invention, an expansive cement is provided which comprises a mixture of the above described expansive cement composition and a hydratable cement such as Portland cement.

DETAILED DESCRIPTION OF THE INVENTION

Thus, we have discovered that the addition of a small amount of MgO to a free lime expansive cement composition will result in that composition having an improved ability to grab steel reinforcing members. The free line cement composition must be one in which substantially all of the silicate present in the composition is in the form of $C_3S$ and there is substantially no $C_2S$ therewithin (no more than about 5% by weight of $C_2S$ therewithin). The composition must contain an effective amount of free lime or uncombined lime which will impart expansive properties thereto. Generally, from about 1 to about 70 weight percent of the composition must be free CaO. The composition can be manufactured from conventional ingredients that are normally fed to a Portland cement kiln. Therefore, constituents other than free lime and tricalcium silicate and MgO can be present within the composition. For example, the composition will contain aluminate generally in the form of tricalcium aluminate ($C_3A$) and iron generally in the form of tetracalcium aluminoferrite ($C_4AF$). In addition, the composition can contain minor quantities of other impurities normally found in feed to Portland cement kilns such as phosphates and alkalies. Furthermore, mineralizers such as fluorspar can be added. As will be discussed hereinbelow, the composition of the subject invention will generally have a liquid phase which forms in the burning of the clinker in an amount in the range of from about 15 to about 35% by weight of the composition.

It is not understood why the small amount of MgO in the free lime expansive cement composition imparts the improved ability of the composition to grab the steel reinforcing members. We have found that when a threshold amount of MgO is present in the free lime expansive cement composition, the amount of grab or the ability for the composition to bond to and stretch the steel reinforcing member is greatly increased. It is necessary that the MgO be uniformly distributed throughout the composition. Generally, we have found that where the magnesium oxide content in the expansive cement is less than about 2% by weight thereof, the probability of obtaining a low percent grab is greatly increased. When this threshold amount of MgO is exceeded, the percent grab is greatly improved. Furthermore, we have found in view of the limited solubility of magnesium oxide in the liquid phase and silicate phase of the clinker, if too great an amount of periclase (free crystalline MgO) is formed in the clinker, it can have adverse effects, particularly if it is poorly distributed throughout the clinker and has a large particle size. Therefore, it is preferred that the MgO be uniformly distributed throughout the clinker as a solid solution in the liquid phase, and diffused in the silicate phase, and in the form of crystals or crystallites of MgO, substantially all of which are of a size of 10 microns or less. Generally, it is preferred that at least 75% by weight of the MgO crystals or crystallites present in the composition have a size of 10 microns or less and more preferably at least from about 90% by weight thereof have a size of 10 microns or less. The presence of greater quantities of MgO crystals of a larger particle size will generally have no effect on the ability of the expansive composition to grab the steel reinforcing members, but may result in unsound cements or concretes because such larger crystals of MgO are known to cause delayed and possibly disruptive expansion in mortars and concrete due to expansion which accompanies slow hydration of the large periclase particles. The smaller particles of MgO used in the scope of the subject invention do not cause delayed and disruptive expansion. It is preferred that the MgO not be present in the composition in amounts greater than about 7% by weight thereof, even though under certain conditions greater quantities may be used. The most preferred range of MgO within the clinker is between about 3 and about 5 weight percent thereof.

The effectiveness of MgO content in enhancing the grab effect of a free lime type expansive cement composition varies somewhat with the percent of free lime in the expansive composition. The MgO within the preferred ranges stated above is most effective when the free lime content of the expansive composition varies between about 5 and about 30% by weight thereof. When the free lime content reaches about 40% by weight or greater, the formulation containing the preferred amount of MgO still exhibits a superior performance to a similar free lime containing expansive composition having a lesser amount of MgO, although the performance of the latter will have improved.

The expansive cement composition of the subject invention is preferably made from argillaceous and calcareous reactant materials which are normally used in the production of Portland cement clinker, and magnesia (magnesium oxide) supplying materials. The source of the magnesium oxide can be in the calcareous and argillaceous reactant materials, as it is well known that depending upon geographic location, such materials may be quarried which naturally have high amounts of magnesium oxide, frequently in the form of the mineral brucite.

In the case of other argillaceous and calcareous reactant materials which contain substantially lesser amounts of magnesium oxide, as is described in this subject invention, materials must be added which have a high magnesium oxide content and thus raise the total magnesium oxide content of the expansive cement composition to a range of about 2 to about 7% by weight thereof. Materials which can be used include any argillaceous, calcareous or magnesia reactant materials which have a composition compatible with the composition of Portland cement. Examples of suitable materials include dolomite, magnesia limestone, magnesium hydroxide, magnesium oxide, magnesium carbonate, and certain magnesium silicates such as serpentine, mixtures thereof, and the like.

Generally, the argillaceous and calcareous reactant materials and magnesia supplying materials are reacted in a conventional cement kiln such as rotary kiln which is operated under such conditions that the starting silicate materials within the argillaceous materials will react with the lime within the calcareous material to the extent that the stoichiometric laws will allow and form primarily tricalcium silicate and the excess amount of free lime. This process will inherently distribute the MgO uniformly throughout the clinker. This process is carried out by operating the kiln under "normal" to "hard burn" conditions. The kiln is operated at a temperature in the range of from about 2500° F to about 2900° F and preferably at a temperature between about 2650° F to about 2750° F, and the materials are reacted in the burning zone of the kiln for a time sufficient to convert all, or substantially all, of the silicate materials to tricalcium silicate. This will inherently distribute the MgO throughout the clinker and allow it to enter the liquid phase as a solid solution, diffuse into the silicate phase, and become diffused throughout the composition in the form of very fine crystallites or crystals of periclase, the vast majority of which have a size no greater than about 10 microns. Additionally, the clinker should be cooled no more slowly than free lime expansive cement clinkers are conventionally cooled. A slower cooling of the clinker may cause excess quantities of periclase crystals to form which have a size larger than about 10 microns.

To assist burnability of the above mentioned calcareous, argillaceous, and magnesia materials, the raw feed which enters the kiln is preferably ground to a sufficient fineness so that complete reaction occurs between all of the reactants within the burning zone of the kiln. For example, if dolomite is used as the magnesia supplying material, its diffusion and solubility throughout the clinker matrix is enhanced by a fine particle size as this material is generally quite hard in comparison to other argillaceous and calcareous reactant materials, and insufficient grinding or screening will allow large particles of dolomite to pass into the kiln. It has been found that these larger particles tend to give an excessive inhomogeneity of periclase within the clinker. In similar fashion, large quartz or silica particles within the reactant mixture will react with surrounding lime and form $C_2S$ and then $C_3S$. However, because of the large particle size of such materials, the immediately surrounding area will become depleted in lime, and if insufficient time is available for diffusion of calcium ions to the site, the result will be what is termed a "belite nest" which is a ring of $C_2S$ surrounding the residual quartz particle. To avoid these complications, the raw feed materials should preferably have a particle size such that no less than about 97% by weight thereof passes through a 50 mesh (Tyler) screen, and no less than about 80% by weight thereof passes through 200 mesh (Tyler) screen.

The improved expansive cement composition of the subject invention will have a liquid phase from about 15 to about 35% by weight thereof and more preferably from about 25 to about 30% by weight thereof as calculated by the well known method of Lee and Parker, which is set forth in Building Research Technical Paper No. 16, His Majesty's Stationary Office, London, 1935, which is herein incorporated by reference into this application. For example, when the composition of the subject invention is made at the preferred temperature of between about 2650° F and about 2750° F, the percent liquid phase at this temperature based on the percentage contents of $Al_2O_3$, $Fe_2O_3$, MgO, $K_2O$ and $Na_2O$ in the clinker will be 3.0 (%$Al_2O_3$) + 2.25 (%$Fe_2O_3$) + %MgO + %$K_2O$ + %$Na_2O$. As the percentage liquid phase formed depends upon the burning temperature and is lower when the burning temperature is also lower, it is noted that when the composition of the subject invention is made at a temperature of about 2550° F, the percent liquid phase will be 2.95 (%$Al_2O_3$) + 2.20 (%$Fe_2O_3$) + %MgO + %$K_2O$ + %$Na_2O$. The value of MgO shall not exceed 2% in the above liquid phase calculations.

After the clinker of the subject invention is burned, it can either be ground separately or interground with a conventional Portland cement clinker, as desired. When ground separately, the clinker should be ground to a particle size no larger than about 80 mesh (Tyler) and a Blaine fineness of no greater than about 4700 $cm^2$/gm as determined by ASTM C204–68. More preferably, the expansive composition of the subject invention has a particle size that substantially passes 100 mesh (Tyler) and a fineness in the range of from about 2000 to 3700 $cm^2$/gm.

If the expansive composition of the subject invention is ground to a very low fineness, it will hydrate at a reduced rate and result in rather high and somewhat delayed or extended rates of expansion. On the other hand, when the composition of the subject invention is ground to a fineness much higher than about 4700 cm$^2$/gm, the expansion occurs more rapidly and is of lower magnitude even though in both of these cases the percentage of free lime available is the same as one ground to the preferred fineness set forth above.

The expansive cement composition of the subject invention can be utilized alone as an expansive cement composition. In such a case, conventional amounts of gypsum can be ground therein to achieve a measure of set control. In addition, the expansive cement composition of the subject invention can be blended with conventional cement compositions to impart expansive qualities to such conventional compositions. Furthermore, as explained herein below, the expansive cement composition clinker of the subject invention can be interground with clinkers of the conventional cement compositions. For example, the expansive cement composition of the subject invention can be blended or interground with all types of Portland cement, including ASTM Types I through V, masonry Portland cement, special colored Portland cement, and pozzolanic cement, such as ASTM Type IP. Such pozzolanic cements include cements containing fly ash, slag, calcined clays or shales, or other materials often used as a blend in various Portland cements. In addition, the cement composition of the subject invention can be used with non-Portland cements such as calcium aluminate cements or gypsum cements.

It is noted that the free calcium oxide in the expansive composition is an extremely strong desiccant and the expansive composition must be protected from humid air and other sources of moisture. This is difficult to achieve in practice as even water of crystallization in gypsum which is interground with the expansive clinker to achieve a measure of set control may be slowly removed and adsorbed by the free calcium oxide particles. Such process may be enough to cause some degree of fracturing of the ground cement particles. This so-called decrepitation or reduction of particle size has been found to slowly occur in stored free-lime containing expansive cements, particularly that stored in large silos or bins at a cement plant. For example, over a period of several months, the average particle size of the expansive composition expressed in times of Blaine fineness may increase by as much as a 1000 cm$^2$/gm. Accordingly, it is desirable to grind the expansive clinker to as low a surface area as can provide adequate expansion and rate of expansion, so as to allow sufficient latitude for possible loss of performance upon storage.

In accordance with another embodiment of the subject invention, it has been discovered that if the expansive clinker of the subject invention is interground with Portland cement clinker to produce an expansive cement composition which can be used directly, without dilution or the addition of further Portland cement, the increase in fineness (decrepitation) during storage appears to be lessened and storage life is therefore prolonged.

Generally, when the expansive cement composition of the subject invention contains less than about 10% by weight of free lime therein, it can be used directly as an expansive cement. When used in a mixture with Portland cement compositions, the expansive cement compositions of the subject invention preferably contains from about 5 to about 45% by weight of free CaO, and more preferably from about 5 to about 30% by weight of free CaO and generally from about 2 to about 7% by weight MgO and preferably from about 3 to about 4% MgO. The expansive cement composition of the subject invention can be combined with any conventional Portland cement at any suitable portion, e.g., from about 1 to about 99% by weight of expansive cement composition in the resultant blend. The expansive cement composition of the subject invention can be tailored for expansiveness not only by controlling the amount of free lime and MgO therewithin, but also by the control of the particle size thereof. Generally, the fineness of the composition will regulate the rate of hydration and expansion. Very simple tests for particle size versus expansion time can be made with the cement for any one particular situation.

In addition to the ability of the expansive cement composition of the subject invention and concrete mixes containing such composition to effectively bond to and stress steel reinforcement members in an improved manner, the expansive composition of the subject invention shows a marked improvement over many conventional expansive compositions in its ability to perform well under elevated temperature and extended mixing time conditions. One of the defects of the earlier sulfoaluminate type expansive cement compositions is that under hot weather conditions where the temperature of the concrete is in excess of 100° F, virtually all of the expansive potential is lost, and the concrete fails to perform in its expected manner. In contrast, the expansive cement composition of the subject invention exhibits both good expansive characteristics and improved ability to stress steel reinforcing members under the elevated temperature mixing and placement conditions which are normal and characteristic in the Southern and Western states in this country during the Summer months. The expansive cement composition of the subject invention can be worked in such warm conditions with usual construction practices which include retempering the mix at the job site with additional water in order to achieve a more workable fluid in the concrete.

The improved qualities of the expansive cement composition of the subject invention are illustrated in greater detail in the following examples. These examples are given to better facilitate the understanding of the subject invention and are not intended to limit the scope thereof.

EXAMPLES

In the following examples, the apparatus and method for testing the ability of an expansive cement composition to bond to and stretch steel reinforcing members which are disclosed in copending U.S. patent application Ser. No. 546,705 filed Feb. 3, 1975, and entitled EXPANSIVE CEMENT MEASUREMENT were utilized, and such application is herein incorporated by reference into the subject application. This copending application discloses a special test specimen which was developed in order to determine the degree of bondability of concrete to a reinforcement steel, and accordingly, the degree that such steel reinforcement is stretched in relation to the degree of expansion of the concrete. This specimen consists of a cast concrete slab 5 × 14 × 37 inches in size, containing a length of No. 3 deformed reinforcement steel bar, or any other desired size steel bar, placed longitudinally within the slab 2½ inches below the top surface thereof, and 2½ inches from one side. The steel bar has a sufficient length to extend longitudinally through the slab and extend from either end thereof. Rectangular risers are welded at both ends of the reinforcement bar which extend from the ends of the specimen and each riser contains a tapped recess on 40 inch centers. Additionally, brass inserts are embedded in the unset concrete positioned at 10 inch intervals across the surface of the slab aligned with the longitudinal axis of the reinforcement bar. The positioning of the insert and the tapped recesses on the risers are such that subsequently inserted Whittemore stainless steel gauge plugs would lie along a line coincident with the longitudinal axis of the reinforcement bar and any adjacent pair of such plugs would be approximately 10 inches, one from the other.

In such a specimen, after the concrete has obtained a final set, the form is removed and initial measurements are made with a Whittemore Strain Gauge across the four 10 inch spans from one end of the reinforcement bar to the other. At appropriate time intervals, the span lengths are again measured, and differential expansion of each is recorded. The expansion of the steel reinforcement bar is calculated taking the sum of the length changes across the four spans and dividing by 3.7 (of the nominal 40 inch length of the steel bar, 37 inches is embedded within the concrete). The expansion of the concrete itself directly over the steel reinforcement bar is determined by taking the average differential expansion of the two center spans, which consists of the three gauge plugs embedded 10 inches apart within the concrete surface. The ratio of steel expansion to concrete expansion is termed grab and is a measure of the degree of stretching of the steel by the expanding concrete. Complete bonding would give a grab of 100% while total slippage of the steel or lack of bonding will yield a grab of 0%. In other words grab is equal to $$100 \times \frac{\text{(units steel deformation)}}{\text{(unit concreate deformation)}}$$

Additionally, brass inserts and gauge plugs are positioned within the concrete surface in a row parallel to the axis of the reinforcement bar, but at a distance 5 or 10 inches away on the surface of the slab, or both. These gauge plugs allow measurement of concrete expansion at varying distances from the steel bar and indicate how far the restraining effect of the steel is exerted on the concrete. In effect, such measurements would indicate the "severe influence" the steel bar has on the concrete in the proximity thereof.

EXAMPLE I

In this Example, conventional sulfoaluminate and free CaO type expansive cement compositions were compared with the improved composition of the subject invention as to expansive performance and ability to grab steel reinforcing members. The sulfoaluminate expansive cements were used directly as commercially obtained. The CaO expansive cement and the CaO–MgO improved expansive cement of the subject invention were blended with Type I Portland cement at such a ratio as to produce the desired amount of expansion. Expansive Composition No. 1 was an expansive cement of the sulfoaluminate type sold by General Portland Inc. under the name "Crakgard". Expansive Composition No. 2 was expansive cement of the sulfoaluminate type sold by Texas Industries Inc. under the name of "ChemComp". Expansive Composition No. 4 was an experimental free calcium oxide expansive cement manufactured by General Portland Inc. Expansive Composition No. 3 as CaO-MgO expansive cement made in the scope of the subject invention. The chemical composition of each of the above expansive cement formulations is set forth in Table 1 below:

Table 1

Chemical Composition of Expansive Cement Formulations

| Chemical Composition | Expansive Composition No. (percent by weight) | | | |
|---|---|---|---|---|
| | 1 | 2 | 3 | 4 |
| $SiO_2$ | 17.4 | 18.9 | 14.1 | 14.1 |
| $Al_2O_3$ | 7.8 | 6.9 | 4.9 | 4.9 |
| $Fe_2O_3$ | 2.2 | 2.4 | 2.7 | 3.6 |
| CaO | 63.0 | 63.3 | 72.5 | 71.8 |
| MgO | 1.0 | 0.8 | 2.5 | 1.2 |
| $SO_3$ | 6.1 | 6.3 | 2.5 | 2.5 |
| Ign. Loss | 1.1 | 1.1 | 1.0 | 1.4 |
| Free CaO | 0.9 | 1.2 | 22.6 | 21.5 |
| Blaine Fineness | 3440 | 3640 | 2200 | 1930 |

Expansive Composition No. 3 and Expansive Composition No. 4 were each blended at a ratio of 25% expansive component to 75% by weight of Type I Portland cement. Thereafter, each of the four expansive compositions were mixed using a standard 5½ sack per yard mix design consisting of 44 parts by weight of cement, 103.8 parts by weight of sand, 175.3 parts by weight of aggregate, and sufficient water to produce a 5.5 inch slump as determined by the method of ASTM C143-69. The resulting concrete mixes containing Expansive Compositions Nos. 1, 2, 3 and 4 were labeled "Concrete Mixture Nos. 1, 2, 3 and 4", respectively. Each of the concrete mixtures was molded into the 5 × 14 × 37 inch slabs containing the 40 inch No. 3 deformed reinforcing steel bar with the rectangular risers molded to the ends thereof and also having the tapped recesses and Whittemore gauge plugs positioned on the risers and on the surface of the slab as described in the introductory paragraphs of the examples above. Each of the test specimens was allowed to cure under ambient conditions and the expansion of the steel reinforcement bar in the slab; the expansion of the concrete in the slabs (a) adjacent to steel reinforcement bar, (b) 5 inches from the axis of the steel reinforcement bar, and (c) 10 inches from the axis of the steel reinforcement bar was measured; and thereafter the grab of the concrete on the reinforcement bar at various distances was calculated as defined in the introductory paragraphs of the examples. The results are set forth in Tables 2 through 6 below:

Table 2

Expansion* of Steel Reinforcement Bar in Slabs(%)

| Concrete Mixture No. | Measurement Interval | | | | | |
|---|---|---|---|---|---|---|
| | Days | | | Months | | |
| | 1 | 7 | 28 | 3 | 6 | 12 |
| 1 | .010 | .000 | −.006 | −.010 | −.013 | — |
| 2 | .009 | .001 | −.007 | −.012 | .005 | −.002 |
| 3 | .018 | .026 | .032 | .071 | .070 | .084 |
| 4 | .018 | .029 | .028 | .020 | .026 | .032 |

*Negative sign indicates that steel in slab became compressed.

Table 3

Expansion* of Concrete in Slabs Adjacent to Steel Reinforcement Bar (%)

| Concrete Mixture No. | Measurement Interval | | | | | |
|---|---|---|---|---|---|---|
| | Days | | | Months | | |
| | 1 | 7 | 28 | 3 | 6 | 12 |
| 1 | .013 | .002 | −.004 | −.001 | −.004 | — |
| 2 | .015 | .006 | −.006 | −.004 | .006 | .005 |
| 3 | .022 | .032 | .046 | .090 | .090 | .095 |
| 4 | .064 | .076 | .074 | .080 | .079 | .084 |

*Negative sign indicates that concrete in slab underwent contraction.

Table 4

Expansion* of Concrete in Slabs 5-Inches from the Axis of the Steel Reinforcement Bar (%)

| Concrete Mixture No. | Measurement Interval | | | | | |
|---|---|---|---|---|---|---|
| | Days | | | Months | | |
| | 1 | 7 | 28 | 3 | 6 | 12 |
| 1 | .015 | .000 | −.003 | .004 | −.002 | — |
| 2 | .015 | .008 | −.005 | −.001 | .006 | .003 |
| 3 | .028 | .037 | .058 | .115 | .106 | .117 |
| 4 | .070 | .099 | .098 | .102 | .109 | .113 |

*Negative sign indicates that concrete in slab underwent contraction.

Table 5

Expansion* of Concrete in Slabs 10-Inches from the Axis of the Steel Reinforcement Bar (%)

| Concrete Mixture No. | Measurement Interval | | | | | |
|---|---|---|---|---|---|---|
| | Days | | | Months | | |
| | 1 | 7 | 28 | 3 | 6 | 12 |
| 1 | .023 | .012 | .009 | .012 | .008 | — |
| 2 | .017 | .009 | −.003 | .000 | .007 | .007 |
| 3 | .027 | .039 | .062 | .135 | .124 | .138 |
| 4 | .101 | .115 | .118 | .119 | .126 | .133 |

*Negative sign indicates that concrete in slab underwent contraction.

Table 6

"Grab" of Concrete on Reinforcement Bar at Various Distances* (%)

| Concrete Mixture No. | Distance from Bar | Measurement Intervals | | | | | |
|---|---|---|---|---|---|---|---|
| | | Days | | | Months | | |
| | | 1 | 7 | 28 | 3 | 6 | 12 |
| 1 | 0 | 77 | 0 | 0 | 0 | 0 | — |
| | 5 | 67 | 0 | 0 | 0 | 0 | — |
| | 10 | 43 | 0 | 0 | 0 | 0 | — |
| 2 | 0 | 60 | 17 | 0 | 0 | 0 | 0 |
| | 5 | 60 | 12 | 0 | 0 | 0 | 0 |
| | 10 | 53 | 11 | 0 | 0 | 0 | 0 |
| 3 | 0 | 81 | 82 | 68 | 79 | 77 | 88 |
| | 5 | 63 | 70 | 54 | 62 | 66 | 71 |
| | 10 | 66 | 65 | 51 | 57 | 57 | 60 |
| 4 | 0 | 28 | 38 | 38 | 26 | 32 | 39 |
| | 5 | 26 | 29 | 28 | 20 | 24 | 29 |
| | 10 | 18 | 25 | 24 | 17 | 20 | 24 |

*Distances are measured on surface of the concrete slab and perpendicularly to the projected axis of the bar.

As can be clearly seen in Tables 2 through 6 above, Concrete Mixture No. 3 containing the improved expansive cement component of the subject invention exhibited superior performance characteristics in that it showed a substantial level expansion and stressing of steel reinforcement, and therefore a high calculated grab over a time period of 1 year. During this time period, drying shrinkage was negligible.

EXAMPLE II

In this Example, four free CaO expansive cement compositions were prepared in which the major compositional difference was the amount of MgO contained within each. Each composition was prepared by burning ground argillaceous and calcareous rock at a temperature between 2700° F and 2800° F in a laboratory pilot rotary kiln, and air quenching the resultant hard densified clinker product. The resulting expansive composition No. 5 clinker, the control composition, contained about 1% by weight MgO; Expansive Composition No. 6 clinker contained about 3% by weight MgO; Expansive Composition No. 7 clinker contained about 5% by weight MgO; and Expansive Composition No. 8 clinker contained 7% by weight MgO. The analysis of these clinker products are given in Table 7 below:

Table 7

Chemical Analyses of Expansive Clinkers Containing Varying Amounts of Magnesium Oxide

| Composition | Expansive Composition No. (Percent by Weight) | | | |
|---|---|---|---|---|
| | 5 | 6 | 7 | 8 |
| $SiO_2$ | 14.2 | 13.8 | 14.1 | 14.0 |
| $Al_2O_3$ | 5.6 | 5.3 | 4.4 | 4.8 |
| $Fe_2O_3$ | 3.2 | 3.1 | 2.9 | 2.9 |
| CaO | 76.0 | 75.0 | 71.4 | 70.7 |
| MgO | 0.9 | 3.0 | 5.4 | 7.0 |
| $SO_3$ | 0.2 | 0.1 | 0.0 | 0.0 |
| Ign. Loss | 0.7 | 0.3 | 1.3 | 1.0 |
| $Na_2O$ | 0.1 | 0.0 | 0.0 | 0.0 |
| $K_2O$ | 0.5 | 0.3 | 0.2 | 0.1 |
| Free CaO | 25.6 | 25.4 | 24.0 | 22.6 |

Next, all the expansive compositions 5 through 8 clinkers were ground in a steel ball mill with gypsum in the quantity of 24 parts by weight clinker and 1 part by weight of gypsum. Each of the ground products was then passed through a 100 mesh screen (Tyler) and all particles which were retained on the screen were discarded. The ground cement of clinker composition No. 1 had a Blaine surface area of 3245 cm²/gm; the ground cement of clinker composition No. 2 had a Blaine surface area of 3040 cm²/gm; the ground cement of clinker composition No. 3 had a Blaine surface area of 3054 cm²/gm; and the ground cement of clinker composition No. 4 had a Blaine surface area of 3054 cm²/gm all determined by ASTM C204-68.

An expansive cement composition was made from each of the ground cements of Expansive Composition Nos. 5, 6, 7 and 8 by blending 25% by weight of each of such compositions with 75% by weight of Type I Portland cement. Concrete Mixture Nos. 5, 6, 7 and 8 were prepared which contained the ground expansive cement composition Nos. 5, 6, 7 and 8, respectively, by mixing each of the above described expansive cement mixtures with aggregate and water in a standard mix design containing a cement factor of 5½ sacks of cement per cubic yard of finished concrete. Each concrete sample made comprised 44 parts by weight of cement, 103.8 parts by weight of sand, 175.3 parts by weight of coarse aggregate (crushed limestone), and sufficient water (about 28 parts by weight), so that the resulting sample mixes had a slump of 5½ inches as determined by the method of ASTM C143-69.

Portions of each of the concrete mixtures 5, 6, 7 and 8 were then individually cast into a wooden mold to form the above described 5 × 14 × 37 inch slab containing the length of No. 3 to form reinforcement steel bar placed longitudinally within the slab as described in the introductory paragraphs of the examples, specifically, the 40 inch steel bar was placed longitudinally within the slab 2½ inches below the top surface thereof and 2½ inches from one side thereof. Rectangular risers were securely welded to both ends of the reinforcement bar and each riser contained a tapped recess on 40 inch centers. Additionally, as described in the introductory paragraphs of the examples, brass inserts were embedded in the unset material positioned at 10 inch intervals across the surface of the slab aligned with the longitudinal axis of the reinforcement bar. The positioning of the inserts and the tapped recesses on the riser was such that subsequently inserted gauge plugs would lie along a line coincident with the longitudinal axis of the reinforcement bar and any adjacent pair of such plugs would be approximately 10 inches one from the other.

After pouring, the 5 × 14 × 37 inch specimens were allowed to set under damp burlap for about 6 hours and at that time, the mold was removed. The steel gauge plugs were then secured in place by insertion into the appropriate tapped recesses as described in the introductory paragraphs of the examples. The initial measurements were then taken with a "Whittemore" strain gauge and the slabs were coated with a curing compound to retard moisture loss from the slab. The slabs remained on the laboratory floor at approximately 75° C and 50% relative humidity for about 1 month and then were removed to a location outside the laboratory where they were subjected to ambient weather conditions. Measurements were taken at weekly intervals for the first month, monthly for the next three months, and then every third month thereafter for a total period of 1 year. The data showing the expansion of steel reinforcement bar in each slab is set forth in Table 8 below, and the expansion of the concrete in the specimen slab adjacent slab adjacent to the steel reinforcement bar is set forth in Table 9 below, and the grab of the concrete on the reinforcement bar was calculated by the method set forth in the introductory paragraph of the examples and is set forth in Table 10 hereinbelow.

Table 8

Expansion of Steel Reinforcement Bar in Slabs (%)

| Concrete Mixture No. | Measurement Interval | | | | | |
|---|---|---|---|---|---|---|
| | Days | | | Months | | |
| | 1 | 7 | 28 | 3 | 6 | 12 |
| 5 | .018 | .029 | .028 | .020 | .026 | .032 |
| 6 | .011 | .019 | .038 | .058 | .075 | .090 |
| 7 | .005 | .014 | .017 | .036 | .052 | .059 |
| 8 | .024 | .037 | .038 | .048 | .075 | .082 |

Table 9

Expansion of Concrete in Slabs Adjacent to Steel Reinforcement Bar (%)

| Concrete Mixture No. | Measurement Interval | | | | | |
|---|---|---|---|---|---|---|
| | Days | | | Months | | |
| | 1 | 7 | 28 | 3 | 6 | 12 |
| 5 | .064 | .076 | .074 | .080 | .079 | .084 |
| 6 | .018 | .030 | .051 | .074 | .092 | .108 |
| 7 | .017 | .025 | .032 | .052 | .066 | .071 |
| 8 | .036 | .050 | .054 | .070 | .098 | .104 |

Table 10

"Grab" of Concrete on Reinforcement Bar (%)

| Concrete Mixture No. | Measurement Interval | | | | | |
|---|---|---|---|---|---|---|
| | Days | | | Months | | |
| | 1 | 7 | 28 | 3 | 6 | 12 |
| 5 | 28 | 38 | 38 | 26 | 32 | 39 |
| 6 | 63 | 64 | 74 | 78 | 82 | 84 |
| 7 | 27 | 54 | 54 | 71 | 79 | 82 |
| 8 | 65 | 74 | 70 | 68 | 77 | 79 |

Tables 8, 9 and 10 clearly show that once a threshold value of magnesium oxide in the composition has been surpassed, the grab is greatly increased. More specifically, there are relative minor differences in grab between concrete mixtures 6, 7 and 8 even through the magnesium oxide content varied between 3 and 7% in the expansive component and the free CaO content of the expansive component varied between 22.6 and 25.4 weight percent thereof. Concrete Mixture No. 1 which contained less than 1% of the MgO in the expansive component thereof exhibited much lower grab than any of the other compositions.

A portion of each of the concrete mixtures 5, 6, 7 and 8 were individually poured into standard 3 × 3 × 10 inch molds, one-half containing a ¼ inch threaded steel reinforcing rod extending longitudinally through the mold and connected to two steel plates on the opposite ends thereof and one-half containing no steel reinforcement.

After casting and setting for about 6 hours, the 3 × 3 × 10 inch bars were demolded, initially measured with a length comparator and then placed in a moist room where they remained throughout the test period at a temperature of 73° F and a relative humidity of approximately 100%. The 3 × 3 × 10 inch test bars were measured daily for a period of 1 week, and then weekly until a month had elapsed. At this point, they were placed in a 180° F stream cabinet for a period of three days. Upon removal, they were cooled overnight in a moist room and measured to determine length changes due to steam treatment. Next, the steam treated bars were autoclaved for 3 hours at 3000 psi, again cooled in a moist room overnight, and measured. The results are set forth in Tables 11 and 12 below.

Table 11

Restrained Expansion of 3 × 3 × 10-Inch Bars (%)

| Concrete Mixture No. | Measurement Interval | | | | |
|---|---|---|---|---|---|
| | Days | | | Condition After 28 Days | |
| | 1 | 7 | 28 | Steam | Autoclave |
| 5 | .027 | .040 | .095 | .120 | .097 |
| 6 | .032 | .052 | .072 | .179 | .208 |
| 7 | .015 | .024 | .051 | .116 | .160 |
| 8 | .020 | .068 | .066 | .175 | .211 |

Table 12

Unrestrained Expansion of 3 × 3 × 10-Inch Bars (%)

| Concrete Mixture No. | Measurement Interval | | | | |
|---|---|---|---|---|---|
| | Days | | | Condition After 28 Days | |
| | 1 | 7 | 28 | Steam | Autoclave |
| 5 | .087 | .101 | .112 | .145 | .172 |
| 6 | .048 | .077 | .125 | .485 | .535 |
| 7 | .024 | .067 | .087 | .232 | .301 |
| 8 | .082 | .126 | .140 | .441 | .522 |

Data set forth in Table 11 as compared to Table 9 indicates the nature of the differences experienced between the small cast bars maintained at approximately 100% humidity, and the more realistic larger slab specimens. Over the measurement period of 28 days, the fully restrained bars exhibited a greater expansion than the slabs which were restrained only to the degree indicated by the amount of grab of concrete to steel reinforcement bar. Furthermore, as shown in Table 12 the levels of expansion are even greater where the bars underwent complete unrestrained expansion.

The expansion due to steam treatment and autoclaving indicate the maximum possible expansion of the high temperature conditions, and as this expansion value changes little with respect to the level of magnesium oxide, it is clear that such expansion is mostly due to the preference of free lime, and possibly due to recrystallization of very small calcium hydroxide crystallites and to larger crystals. Crystal coarsing resulting from heat treatment is well known in the chemical literature. Thus, differences in the expansion of the four concrete mixes are within expected experimental variation and show no definite trend due to progressive compositional changes.

This is further brought out by the data set forth in Tables 8 through 10 which show the expansion of concrete slabs stored out-of-doors and subject to all variations of winter cold, summer heat, and wide ranges of ambient moisture content were stabilized by the first six month period and very little change in dimension had occurred during the next six month period. Thus, this example clearly shows not only the beneficial effect of the magnesium oxide in the free calcium oxide expansive composition, but also the long term stability of such compositions.

EXAMPLE III

Still another expansive composition of this invention was produced by burning an argillaceous and calcareous raw mix containing ground dolomite (calcium magnesium carbonate) in a kiln. The proportions of said raw materials were controlled such that the resulting mix would produce about 40% by weight free CaO and about 4% by weight MgO therewithin. A second control composition was formulated in the same fashion, but lacked any additional source of magnesium oxide. This composition was controlled such that the resulting mix would produce about 40% by weight free CaO and about 1% by weight MgO therewithin.

Both mixtures were passed into a kiln and heated to a temperature of about 2650° F. The clinker from the kiln containing about 4% by weight MgO was ground with gypsum at the ratio of 24 parts by weight expansive clinker to 1 part by weight of gypsum to a Blaine fineness of 2810 cm²/gm and the resultant expansive cement component was called Expansive Composition No. 9. The control clinker, which contained about 1% by weight MgO, as ground with gypsum in the same proportion to a Blaine fineness of 2720 cm²/gm, and the resultant expansive cement component was called Expansive Composition No. 10. The two expansive cement compositions were analyzed and the results of the analyses are set forth in Table 13.

Table 13

Chemical Analysis of Expansive Cement Components Containing Two Levels of Magnesium Oxide

| Chemical Composition | Expansive Composition No. (Percent by Weight) | |
|---|---|---|
| | 9 | 10 |
| SiO$_2$ | 10.4 | 10.9 |
| Al$_2$O$_3$ | 3.6 | 3.9 |
| Fe$_2$O$_3$ | 2.9 | 2.9 |
| CaO | 75.5 | 77.9 |
| MgO | 3.7 | 1.0 |
| SO$_3$ | 2.1 | 2.3 |
| Ign. Loss | 1.4 | 1.8 |
| Free CaO | 40.0 | 41.9 |

Two expansive concrete mixtures were prepared, which each comprised 44 parts by weight of cement (consisting of 15% of the above described expansive compositions and 85% of standard Type I Portland cement), 103.8 parts by weight of sand, 175.3 parts by weight of coarse aggregate (crushed limestone), and sufficient water (about 28 parts by weight), so that the resulting sample mixes had a slump 5½ inches as determined by the method of ASTM C143-69. The concrete prepared from Expansive Composition No. 9 is referred to as Concrete Mixture No. 9, and the concrete prepared from Expansive Composition No. 10 is referred herein as Concrete Mixture 10.

Both expansive compositions were cast into 5 × 14 × 37 inch slabs, each containing a length of No. 3 deformed reinforcement steel, and each carried the brass inserts as described in the introductory paragraphs of the Examples. Next, each slab was cured and measured as was described in Example II.

Initial measurements were taken with a Whittemore strain gauge on both slabs at the age of about six hours when the forms were removed, and then subsequently measured periodically up to six months. Measurements of the 5 × 14 × 37 inch slabs are given in Tables 14, 15 and 16 below, in which Table 14 shows the expansion of the steel reinforcement bar within each slab, Table 15 shows the expansion of the concrete adjacent to the reinforcement bar, and Table 16 shows the percent grab of the concrete on the reinforcement bar and additionally at distances at 5 and 10 inches from the longitudinal axis of the reinforcement bar.

Table 14

Expansion of Steel Reinforcement Bar in Slabs (%)

| Concrete Mixture No. | Measurement Interval | | | | | |
|---|---|---|---|---|---|---|
| | Days | | | Months | | |
| | 1 | 7 | 28 | 2 | 3 | 6 |
| 9 | .050 | .054 | .046 | .047 | .078 | .072 |
| 10 | .023 | .027 | .027 | .033 | .039 | .028 |

Table 15

Expansion of Concrete in Slabs Adjacent to Steel Reinforcement Bar (%)

| Concrete Mixture No. | Measurement Interval | | | | | |
|---|---|---|---|---|---|---|
| | Days | | | Months | | |
| | 1 | 7 | 28 | 2 | 3 | 6 |
| 9 | .058 | .062 | .056 | .056 | .079 | .072 |
| 10 | .030 | .033 | .032 | .038 | .041 | .032 |

Table 16

**"Grab" of Concrete on Reinforcement Bar at Various Distances* (%)**

| Concrete Mixture No. | Distance from Bar (in.) | Measurement Interval | | | | | |
|---|---|---|---|---|---|---|---|
| | | Days | | | Months | | |
| | | 1 | 7 | 28 | 2 | 3 | 6 |
| 9 | 0 | 87 | 89 | 83 | 84 | 99 | 100 |
| | 5 | 80 | 76 | 68 | 67 | 82 | 83 |
| | 10 | 62 | 60 | 54 | 53 | 68 | 67 |
| 10 | 0 | 75 | 83 | 85 | 88 | 94 | 88 |
| | 5 | 47 | 49 | 51 | 53 | 58 | 48 |
| | 10 | 35 | 38 | 37 | 42 | 46 | 36 |

*Distances are measured on surfaces of slab and perpendicularly to the projected axis of the bar.

As can be seen in the data presented in the above Tables 14-16, as the free CaO increases to 40% and above, the effect of the MgO on grab or the gripping of the steel by the concrete at a point adjacent the steel diminishes. That is to say, the grab adjacent the steel is excellent for both cases, with and without added magnesium oxide. However, in such cases of higher free lime content, the addition of magnesium oxide to the expansive composition aids in extending the "sphere of influence" of the steel reinforcement bar in restraining the expanding concrete at greater distances therefrom. In the case described in this example, although directly adjacent to the steel, the variation in grab between Concrete Mixtures 9 and 10 are negligible, but it becomes significant at distances of 5 and 10 inches from the longitudinal axis of the reinforcement bar. Thus at an age of six months, the grab of Concrete Mixture No. 9 which contains almost 4% magnesium oxide, at a distance of 5 inches from the axis of the steel bar in 42% greater than the grab of Concrete Mixture No. 10, which contains only 1% magnesium oxide. Accordingly, at a distance of 10 inches from the longitudinal axis of the reinforcement bar, the grab of Concrete Mixture No. 9 is 46% greater than the corresponding grab of Concrete Mixture No. 10.

Therefore, it is apparent in this example, the effect of magnesium oxide additions to a free calcium oxide expansive cement composition made according to the subject invention is still useful at free lime levels of 40% and up, and in this case, the major effect is not only to maintain the expected increases and high level of percent grab of the concrete on the steel reinforcement bar, but also to extend the sphere of influence on the expanding concrete by said reinforcement bar.

EXAMPLE IV

Another expansive cement composition of this invention was produced by burning an argillaceous, calcareous and magnesia raw mix in a laboratory rotary kiln. The ratio of reactants was designed such that the resulting mix would have about 28% by weight MgO therewithin. The mixture was burned in two stages. First, half of the raw mix was passed into the kiln and heated to a temperature of about 2450° F. The clinker from the kiln was cooled and was subsequently ground with gypsum at a ratio of 23.75 parts of expansive clinker to 1.25 parts of gypsum to a Blaine surface area of 2810 cm²/gm. This ground cement was called Expansive Composition No. 11.

The remaining half of the original raw mix was likewise passed into the kiln and heated to a temperature of about 2700° F. The clinker was air cooled and ground with gypsum at the same ratio as Expansive Composition No. 11 to a Blaine surface area of 2790 cm²/gm. This ground cement was called Expansive Composition No. 12.

A second raw mix was designed, which by proper proportioning of the argillaceous, calcareous, and magnesia reactants, would produce upon burning in a laboratory rotary kiln a clinker having about 28% by weight free lime and about 4% by weight magnesium oxide therewithin. The raw mix was also burned in two stages. The first half was passed into the kiln and heated to a temperature of about 2450° F. The resulting clinker was air cooled, ground with gypsum in a ball mill at the ratio of 23.75 parts of clinker to 1.25 parts of gypsum to obtain a Blaine surface area of 2810 cm²/gm. This ground cement was called Expansive Composition 13. The remaining half of the raw feed was burned in the kiln at an increased temperature of about 2700° F. The resulting clinker was similarly air cooled, ground with the same proportion of gypsum as the first half of the lower temperature burned clinker to a Blaine surface area of 2810 cm²/gm. This ground cement was called Expansive Composition No. 14.

The four compositions were analyzed and the results of those analyses are set forth in Table 17 below.

Table 17

Chemical Analysis of Expansive Cement Components Burned at Two Levels of Kiln Temperature

| Chemical Composition | Expansive Composition No. (Percent by Weight) | | | |
|---|---|---|---|---|
| | 11 | 12 | 13 | 14 |
| SiO₂ | 12.5 | 12.0 | 14.0 | 13.7 |
| Al₂O₃ | 3.9 | 4.7 | 3.1 | 3.1 |
| Fe₂O₃ | 4.4 | 4.6 | 3.1 | 3.0 |
| CaO | 72.8 | 72.6 | 71.8 | 70.7 |
| MgO | 3.2 | 3.2 | 3.8 | 3.8 |
| SO₃ | 2.3 | 2.5 | 2.1 | 4.3 |
| Ign. Loss | 1.3 | 1.4 | 2.1 | 1.5 |
| Na₂O | 0.1 | 0.0 | 0.1 | 0.1 |
| K₂O | 0.3 | 0.1 | 0.1 | 0.2 |
| Free CaO | 30.4 | 29.1 | 31.0 | 26.8 |

Concrete 5 × 14 × 37 inch test slabs as described in the introductory paragraphs of the Examples were prepared for expansion test using Expansive Composition No. 11 and Expansive Composition, No. 12. Concrete Mixture No. 11 was prepared by using 25% of Expansive Composition No. 11 and 75% of a Type I Portland cement to comprise the cement portion of the mix. Concrete Mixture No. 12 was prepared by using 25% of Expansive Composition No. 12 and 75% of a Type I Portland cement to comprise the cement portion of this mix. Concrete Mixture No. 13 was prepared by using 25% of Expansive Composition No. 13 and 75% of Type I Portland cement to comprise the cement portion of the mix. Similarly, Concrete Mixture No. 14 was prepared by using 25% of Expansive Composition No. 14 and 75% of Type I Portland cement to comprise the cement portion of the mix.

In all four cases, the final concrete mix consisted of 44 parts by weight of the above described cement blends, 103.8 parts by weight of sand, 175.3 parts by weight of coarse aggregate, and sufficient water (about 28 to 29 parts by weight) to produce a concrete slump of 5½ inches.

The resultant 5 × 14 × 37 inch slabs, each containing a length of No. 3 deformed rebar, were cast, cured, and measured as previously described in Example II. The expansions of the steel reinforcement bar within the test slab are given in Table 18, the expansions of the concrete adjacent to the reinforcement bar are given in Table 19 and the percent grab of the concrete on the reinforcement bar is shown in Table 20.

Table 18

| Concrete Mixture No. | Expansion of Steel Reinforcement Bar in Slabs (%) | | | | | |
|---|---|---|---|---|---|---|
| | Measurement Interval | | | | | |
| | Days | | | Months | | |
| | 1 | 7 | 28 | 2 | 3 | 6 |
| 11 | .034 | .054 | .084 | .180 | .181 | .192 |
| 12 | .030 | .037 | .044 | .085 | .091 | .105 |
| 13 | .071 | .082 | .092 | .260 | .358 | .368 |
| 14 | .090 | .088 | .088 | .081 | .088 | .077 |

Table 19

| Concrete Mixture No. | Expansion of Concrete in Slabs Adjacent to Steel Reinforcement Bar (%) | | | | | |
|---|---|---|---|---|---|---|
| | Measurement Interval | | | | | |
| | Days | | | Months | | |
| | 1 | 7 | 28 | 2 | 3 | 6 |
| 11 | .038 | .064 | .094 | .200 | .206 | .226 |
| 12 | .044 | .056 | .063 | .108 | .114 | .130 |
| 13 | .049 | .054 | .063 | .230 | .277 | .281 |
| 14 | .054 | .050 | .048 | .042 | .050 | .050 |

Table 20

| Concrete Mixture No. | "Grab" of Concrete on Reinforcement Bar (%) | | | | | |
|---|---|---|---|---|---|---|
| | Measurement Interval | | | | | |
| | Days | | | Months | | |
| | 1 | 7 | 28 | 2 | 3 | 6 |
| 11 | 88 | 84 | 90 | 88 | 88 | 85 |
| 12 | 69 | 66 | 70 | 79 | 80 | 80 |
| 13 | 69 | 67 | 68 | 89 | 78 | 76 |
| 14 | 58 | 57 | 54 | 51 | 56 | 65 |

As can be seen, the two groups of expansive concrete, each consisting of an expansive cement component burned at a lower and a high temperature, have roughly the same expansive characteristics up to about 28 days. Beyond this point in time, the concrete which contained the expansive cement component (Concrete Mixtures Nos. 11 and 13) which was ground from a clinker burned at a lower temperature, underwent a very rapid increase in expansion, and thus if not adequately restrained, might possibly reach a level which could be considered disruptive or at least result in a loss of mechanical strength due to microcrack formation.

In all four cases illustrated in this example, due to the beneficial effect of an elevated magnesium oxide level practiced according to the subject invention, the percent grab remained high. This occured even in those cases of delayed high expansion.

EXAMPLE V

Another expansive cement composition of the subject invention was produced by burning an argillaceous, calcareous, and magnesia raw mix in a large commercial rotary kiln. The ratio of said reactants was controlled such that the resulting mix would have been 26% by weight and 27% by weight free lime and 4% by weight magnesium oxide therewithin. The mixture was passed into the kiln and heated to a temperature of about 2750° F. The clinker from the kiln passed into a grate cooler, was air cooled and subsequently was conveyed into a finish mill and storage tank. It was ground in a closed circuit grinding system with gypsum to a Blaine fineness of 3270 cm²/gm, and 99.3% by weight of the particles passed through a 100 mesh (Tyler) screen, 95.0% by weight of the material passed through a 200 mesh (Tyler) screen and 80.9% by weight passed through a 325 mesh (Tyler) screen. The resulting ground cement composition had 26.1% free lime, 3.7% magnesium oxide, and the remaining constituents were tricalcium silicate, tricalcium aluminate, and tetracalcium aluminoferrite. This cement was called Expansive Composition No. 15. The composition was analyzed, and the results of the analysis are set forth in Table 21 below.

Table 21

| Chemical Analysis of a Ground Expansive Cement Component Burned in a Commercial Rotary Kiln | |
|---|---|
| Chemical Composition | Expansive Composition No. 15 (Percent by Weight) |
| $SiO_2$ | 12.9 |
| $Al_2O_3$ | 3.8 |
| $Fe_2O_3$ | 4.0 |
| CaO | 71.0 |
| MgO | 3.7 |
| $SO_3$ | 2.6 |
| Ign. Loss | 2.3 |
| Free CaO | 26.1 |

This Expansive Composition No. 15 was utilized to determine the effect of extended elevated temperature concrete mixing conditions, which are commonplace in many geographical areas during the summer months of the year. Three expansive concrete mixtures were prepared, each of identical composition, and were mixed under varying conditions of time, temperature, and water content. They were subsequently cast into 5 × 14 × 37 inch test slabs, as described in the introductory paragraphs in the Examples.

The concrete mixture utilized contained 44 parts by weight of cement, which consisted of 20% by weight of Expansive Composition No. 15 and 80% by weight of Type I Portland cement, 103.8 parts by weight of sand, 175.3 parts by weight of coarse aggregate, and sufficient water to obtain a 5½ inch slump. Additionally, a control mixture was prepared in which the cement fraction of the concrete consisted of 100% Type I Portland cement. No slab was cast with this concrete.

The concrete mixer used for these tests was preconditioned by being allowed to stand for several hours in the hot summer sun. Additionally, the sand and coarse aggregate used was conditioned in an oven to a temperature of 100° F. All water used was preheated to a temperature of 90° F. The first concrete mix, referred to as Concrete Mixture No. 15, was made using a cement portion consisting of 100% Type I Portland cement and the other heated materials previously described. The slump was adjusted to 5½ inches with hot water and the temperature of the concrete was measured. The hot concrete was mixed for five minutes, and then the mixer was stopped for a period of four minutes. Mixing was resumed for one minute, and at this point, the concrete allowed to rest for an additional four minutes. Then after one minute of mixing, the slump was determined and the concrete temperature was measured. This cycle of the concrete being allowed to rest four minutes, mixed one minute, was continued and both slump and temperature were determined every 10 minutes until a total of 40 minutes had elapsed. At this time, Concrete Mixture No. 15 was discarded.

Expansive Concrete Mixture No. 16 was prepared in the same fashion as Concrete Mixture No. 15, but it contained a cement fraction consisting of 20% of Expansive Composition No. 15 and 80% Type I Portland cement. It too was initially adjusted to a slump of 5½ inches and the temperature measured. In a similar fashion to the previous test, after being mixed for five minutes, it was allowed to rest four minutes, mixed for one minute, rest for five minutes, mix for one minute and then the slump and temperature measured. Again, this procedure was continued for a total of 40 minutes, at which time Expansive Concrete Mixture No. 16 was cast into a 5 × 14 × 37 inch slab containing a length of No. 3 deformed reinforcement bar as described in the introductory paragraphs in the Examples.

Concrete Mixture No. 17 was identical in composition to Expansive Mixture No. 16. It was mixed with hot starting materials and alternate resting and mixing for a total period of one hour. At this time, it was retempered with hot water to regain the initial slump of 5½ inches, and subsequently cast into a 5 × 14 × 37 inch slab containing a length of No. 3 deformed rebar as described in the introductory paragraphs in the Examples.

Concrete Mixture No. 18 was similarly composed of a cement fraction consisting of 20% Expansive Composition No. 15 and 80% Type I Portland cement, and the proportion of sand and coarse aggregate previously described. This expansive concrete mix was produced within the laboratory with room temperature (about 75° F) conditioned components, and was subsequently mixed for the usual five minute or so mixing time. Sufficient water was added during the mixing procedure to produce a 5½ inch slump. The standard procedure used in producing this concrete was similar to that described in Example II. Concrete Mixture No. 18 was then cast into a 5 × 14 × 37 inch slab containing a length of No. 3 deformed rebar as described in the introductory paragraphs in the Examples.

The effect of elevated temperature and extended mixing time on Concrete Mixture Nos. 15, 16 and 17 are shown in Table 22 below.

Table 22

| | Temperature and Slump of Concrete Mixes Produced at an Elevated Temperature | | | | | |
|---|---|---|---|---|---|---|
| | Concrete Mixture No. | | | | | |
| | 15 | | 16 | | 17 | |
| Time After Initial Mixing | Temp. (° F) | Slump (in.) | Temp. (° F) | Slump (in.) | Temp. (° F) | Slump (in.) |
| 0 | 117 | 5.5 | 118 | 5.5 | 118 | 5.5 |
| 10 | 114 | 2.5 | 112 | 3.5 | 116 | 5.0 |
| 20 | 110 | 3.5 | 109 | 3.25 | 110 | 4.5 |
| 30 | 105 | 3.0 | 107 | 3.0 | 103 | 3.75 |
| 40 | 102 | 2.5 | 104 | 2.25 | 101 | 2.75 |
| 50 | (Discarded) | | (Slab Cast) | | 97 | 2.5 |
| 60 | | | | | 96 | 2.25 |
| | | | | | | 5.5* |
| | | | | | (Slab Cast) | |

*Retempered with 90° F water.

The three 5 × 14 × 37 inch concrete slabs, each containing a length of No. 3 deformed reinforcement steel which were cast from Expansive Concrete Mixture Nos. 16, 17 and 18 were cured and measured as previously described in Example II. The expansions of the steel reinforcement bar within the test slab are given in Table 23, the expansions of the concrete adjacent to the reinforcement bar are given in Table 24, and the percent grab of the concrete on the reinforcement bar is shown in Table 25.

Table 23

| | Expansion of Steel Reinforcement Bar in Slabs (%) | | | | | |
|---|---|---|---|---|---|---|
| Concrete | Measurement Interval | | | | | |
| Mixture | Days | | | Months | | |
| No. | 1 | 7 | 28 | 2 | 3 | 6 |
| 16 | .011 | .012 | .001 | .008 | .006 | .001 |
| 17 | .020 | .028 | .027 | .029 | .035 | .024 |
| 18 | .026 | .023 | .018 | .024 | .017 | .012 |

Table 24

| | Expansion of Concrete Slabs Adjacent to Steel Reinforcement Bar (%) | | | | | |
|---|---|---|---|---|---|---|
| Concrete | Measurement Interval | | | | | |
| Mixture | Days | | | Months | | |
| No. | 1 | 7 | 28 | 2 | 3 | 6 |
| 16 | .015 | .017 | .010 | .019 | .020 | .014 |
| 17 | .032 | .043 | .050 | .052 | .052 | .044 |
| 18 | .036 | .036 | .029 | .036 | .029 | .026 |

Table 25

| | "Grab" of Concrete on Reinforcement Bar (%) | | | | | |
|---|---|---|---|---|---|---|
| Concrete | Measurement Interval | | | | | |
| Mixture | Days | | | Months | | |
| No. | 1 | 7 | 28 | 2 | 3 | 6 |
| 16 | 72 | 68 | 5 | 44 | 32 | 2 |
| 17 | 64 | 65 | 55 | 56 | 66 | 54 |
| 18 | 71 | 64 | 62 | 64 | 58 | 47 |

As can be seen in Table 22, the slump loss of the two expansive concrete mixes (Concrete Mixture Nos. 16 and 17) is no different than that which occurs in an ordinary Portland cement concrete (Concrete Mixture No. 15), when subjected to elevated temperatures and extended mixing times. These conditions are characteristic of summer weather conditions and usual transport times from a concrete batching plant to a particular job site. As can be seen in Table 22, the slump has dropped by about half in all three cases from its original value. Customary practice, when concrete is used in the field, is to add additional mix water in order to increase the slump and therefore the fluidity and ease of placement of the concrete. Concrete Mixture No. 17 was therefore retempered with hot water to raise the slump back to its initial value, and determine subsequently what effect this action would have on the expansion properties and percent grab of a 5 × 14 × 37 inch specimen prepared with this concrete.

Tables 23, 24 and 25 show the results of comparing the three expansive concrete slabs formulated with the same components in the same proportions, but differing in temperature, time of mixing, and also water required to achieve an initial slump of 5½ inches. Concrete Mixture No. 16 which was mixed for a prolonged period at elevated temperatures initially required about 30 parts by weight of water. Concrete Mixture No. 17, which also underwent hot extended mixing and was subsequently retempered to regain the original slump, initially required about 33 parts by weight of water. Finally, Concrete Mixture No. 18, which was mixed for a short period under standard room temperature conditions, initially required about 28 parts by weight of water to reach the required 5½ inches of slump.

Concrete Mixture No. 18 exhibited the usual good grab expected of a concrete prepared from an expansive cement made by the subject invention. Additionally, the level of expansion achieved was also at the level expected for an expansive cement mixture containing about 20% of an approximately 26% free lime component and 80% of a Type I Portland cement.

In the case of Concrete Mixture No. 16, however, the effect of placement of a low slump hot concrete resulted in a reduced level of expansion, and also a poorer and more erratic percent grap. At several times of measurement (that is, 28 days and 6 months), the steel reinforcement bar showed no expansion at all, and was completely slack.

However, in the case of Concrete Mixture No. 17, the percent grab was excellent throughout the entire measurement period and the levels of both steel and concrete expansion were higher than that exhibited by the normally mixed concrete, exemplified by Concrete Mixture No. 18.

This example also clearly shows that the expansive composition of the subject invention can be usefully utilized under conditions of elevated temperature and extended mixing times. It actually shows a superior performance under such temperature and mixing conditions if retempered with water, as is the common custom followed in field practice. This behavior is in direct opposition to the now commonly used sulfoaluminate expansive cements which generally show a greater than normal slump loss during elevated temperature mixing conditions, and almost completely lose their ability to expand under such elevated temperature mixing conditions.

EXAMPLE VI

Still another expansive cement composition of the subject invention was produced by intergrinding quarry rock, high-grade limestone, mill scale and dolomite sand in a commercial two compartment ball mill to produce an argillaceous, calcareous and magnesia containing raw slurry, containing about 38% moisture. The ratio of the reactants utilized in this mix was controlled such that the resulting product would have between 16 and 18% by weight free lime and between 3 and 4% by weight magnesium oxide therewithin. The mixture was passed into a large commercial rotary kiln and heated to a temperature of about 2650° F to 2700° F.

The clinker exiting from the kiln passed into a grate cooler and was subsequently conveyed into a finish mill storage tank. The composition of this clinker is shown in Table 26 below.

Table 26

Chemical Analysis of an Expansive Cement Clinker Burned in a Commercial Rotary Kiln

| Chemical Composition | Percent by Weight |
| --- | --- |
| $SiO_2$ | 16.0 |
| $Al_2O_3$ | 3.9 |
| $Fe_2O_3$ | 4.8 |
| CaO | 69.8 |
| MgO | 3.4 |
| $SO_3$ | 0.2 |
| $K_2O$ | 0.4 |
| $Na_2O$ | 0.1 |
| Ign. Loss | 1.9 |
| Free CaO | 15.7 |

The clinker was interground in a closed circuit grinding system with gypsum and a Type I Portland cement clinker in such proportion that the resultant interground expansive cement had a free lime content of about 7 to 8% by weight, and a $SO_3$ content of about 2.2% by weight. The centrifugal separator into which the mill discharge was fed was adjusted such that the Blaine fineness was about 3200 cm²/gm and 99.3% by weight of the particles passed through a 100 mesh (Tyler) screen, 94.2% by weight of the material passed through a 200 mesh (Tyler) screen, and about 80% by weight passed through a 325 mesh (Tyler) screen. This cement was called Expansive Composition No. 19.

The freshly ground expansive composition was conveyed to a storage silo. Subsequently, four weeks after the grind, the silo was opened and a sample of expansive cement was removed. This cement sample was called Expansive Composition No. 20. Again, at a period of time ten weeks after the initial grind, another sample of cement was withdrawn from the silo. This cement was called Expansive Composition No. 21. The Blaine surface area and free lime content of each Expansive Composition Nos. 19, 20 and 21 is presented in Table 27 below.

Table 27

Surface Area and Free Lime Content of Interground Expansive Cement Stored for Various Periods of Time

| Expansive Composition No. | Storage Time (Weeks) | Surface Area (cm²/gm) | Free CaO(%) |
| --- | --- | --- | --- |
| 19 | 0 | 3190 | 7.1 |
| 20 | 4 | 3290 | 8.4 |
| 21 | 10 | 3330 | 6.8 |

At the time each cement was obtained, it was taken to the laboratory and concrete mixes were prepared. The concrete mix made with Expansive Composition No. 19 is called Concrete Mixture No. 19, that made from Expansive Composition No. 20 is called Concrete Mixture No. 20, and finally, that made with Expansive Composition No. 21 is called Concrete Mixture No. 21.

Each concrete mix prepared contained 44 parts by weight of expansive cement, 103.8 parts by weight of sand, 175.3 parts by weight of coarse aggregate (crushed limestone) and sufficient water to produce a slump of 5½ inches. Concrete Mixture No. 19 required 28.0 parts by weight of water, Concrete Mixture No. 20 required 29.0 parts by weight of water, and Concrete Mixture No. 21 required 28.8 parts by weight of water.

Each of the three concrete mixtures, at the time of their preparation, was cast into a 5 × 14 × 37 inch slab containing a length of No. 3 deformed reinforcement steel as described in the introductory paragraphs in the Examples. The remaining concrete was cast into standard 3 × 3 × 10 inch molds, some containing a ¼ inch threaded steel rod extending longitudinally through the mold and fastened to two steel plates on the opposite ends thereof, and other molds containing no steel reinforcement.

The 5 × 14 × 37 inch slabs and the 3 × 3 × 10 inch bars were subsequently cured and measured as was described in Example II.

Initial measurements were taken on the slabs with a Whittemore strain gauge at the age of about six hours when the forms were removed and then periodically up to three months. The expansion of the steel reinforcement bar within each slab is shown in Table 28. The concurrent expansion of the concrete adjacent to the steel reinforcement bar is shown in Table 29. The calculated percent grab of the concrete on the steel reinforcement bar is shown in Table 30.

Table 28

Expansion of Steel Reinforcement Bar in Slabs (Percent)

| Concrete Mixture No. | Measurement Interval | | | | |
|---|---|---|---|---|---|
| | Days | | | Months | |
| | 1 | 7 | 28 | 2 | 3 |
| 19 | .033 | .036 | .042 | .032 | .034 |
| 20 | .032 | .032 | .024 | .030 | .018 |
| 21 | .034 | .036 | .023 | —* | —* |

*Data not avilable.

Table 29

Expansion of Concrete in Slabs Adjacent to Steel Reinforcement Bar (Percent)

| Concrete Mixture No. | Measurement Interval | | | | |
|---|---|---|---|---|---|
| | Days | | | Months | |
| | 1 | 7 | 28 | 2 | 3 |
| 19 | .049 | .053 | .058 | .052 | .054 |
| 20 | .053 | .053 | .048 | .056 | .044 |
| 21 | .048 | .057 | .042 | —* | —* |

*Data not available.

Table 30

"Grab" of Concrete on Reinforcement Bar (Percent)

| Concrete Mixture No. | Measurement Interval | | | | |
|---|---|---|---|---|---|
| | Days | | | Months | |
| | 1 | 7 | 28 | 2 | 3 |
| 19 | 68 | 68 | 72 | 62 | 62 |
| 20 | 61 | 61 | 50 | 54 | 38 |
| 21 | 71 | 64 | 55 | —* | —* |

*Data not available.

In a similar fashion, the 3 × 3 × 10 inch concrete bars were demolded at an age of six hours and initial measurements were made with a length comparator. Subsequent measurements were made periodically up to an age of one month. Each bar was then placed in a steam cabinet at a temperature of 180° F for a period of three days, cooled overnight in the moistroom and then measured. Steam-treated bars were further placed in an autoclave and heated for three hours at a steam pressure of 300 psi. They were subsequently removed, cooled overnight in the moistroom and measured.

The restrained expansion values of concrete bars over the time period of a month and subsequent steam-treatment conditions described are presented in Table 31. Similar expansion data for unrestrained concrete bars are given in Table 32.

Table 31

Restrained Expansion of 3 × 3 × 10 Inch Bars (%)

| Concrete Mixture No. | Measurement Interval | | | | |
|---|---|---|---|---|---|
| | Days | | | Condition After 28-days | |
| | 1 | 7 | 28 | Steam | Autoclave |
| 19 | .050 | .074 | .090 | .107 | .142 |
| 20 | .064 | .080 | .070 | .099 | .137 |
| 21 | .029 | .057 | .056 | .076 | .105 |

Table 32

Unrestrained Expansion of 3 × 3 × 10 Inch Bars (%)

| Concrete Mixture No. | Measurement Interval | | | | |
|---|---|---|---|---|---|
| | Days | | | Condition After 28-days | |
| | 1 | 7 | 28 | Steam | Autoclave |
| 19 | .165 | .207 | .216 | .268 | .331 |
| 20 | .234 | .274 | .266 | .289 | .343 |
| 21 | .092 | .117 | .121 | .141 | .163 |

The significance of this example is that it demonstrates the stability of the expansive composition of the subject invention under normal conditions of plant silo storage. Table 27, in which the storage age of the interground expansive cement varies from freshly ground material to that which is ten weeks old shows the normal variation in free lime content due to the expected performance of the grinding equipment and the variability of the expansive clinker which was interground with the Type I Portland clinker. However, in terms of the Blaine fineness of the cement, it is noted that there is a progressive increase in surface area, due most likely to a slow fracturing of cement particles or decrepitation resulting from unavoidable moisture adsorption. The free lime particles in the expansive composition are reactive toward moisture, and any moisture available from the dehydration of the interground gypsum or from air seepage into the silo will result in a premature hydration of the free lime. Thus, we may reasonably expect that upon long term storage, the effectiveness of the expansive composition will tend to somewhat diminish. This will be apparent in the increase of measured Blaine fineness and in a reduced expansive capability of any concrete prepared with the expansive cement composition.

Tables 28, 29 and 30 show the effect of silo storage on the expansive effectiveness of the subject cement. Little change in expansive capability appears to have occurred, although at later ages there may be a tendency for the percent grab to decrease. In all cases, the percent grab is high due to the beneficial effects of the magnesium oxide in the expansive clinker prepared according to the composition of the subject invention. It is noted that a greater degree of decrepitation and loss of expansive capability has been in the past noted in stored samples of pure expansive cement component of high free lime content rather than the interground cement described in this example.

A loss of expansive performance, however, is noted in the 3 × 3 × 10 inch bar data presented in Tables 31 and 32. At the end of one month, restrained concrete bars prepared from 10 week old expansive cement suffered about a 38% decrease in expansive capability when compared with restrained concrete bars prepared from freshly ground expansive cement. In a similar fashion, unrestrained concrete bars prepared from 10 week old expansive cement had a measured expansion which was about 44% lower than unrestrained concrete bars prepared with freshly ground expansive cement. Although this loss was not as obvious in the same concrete cast into 5 × 14 × "inch slabs, and may be exaggerated somewhat by the different geometry and smaller size of the 3 × 3 × 10 inch bars, it indicates that a reduction of expansive potential does occur slowly upon storage, but is much less pronounced with an interground expansive cement than with a pure expansive component.

Concrete, at an age of 28 days, which is further subjected to a sequential 180° F steam and then 300 psi autoclave treatment shows the expected additional expansion. This expansion resulting from steam and autoclave treatment also tends to diminish as the expansive cement used in the tested concrete had been stored for increasing lengths of time. Thus, the same trends of lower expansion noted for concrete prepared from freshly ground expansive cement compared to that sampled four and ten weeks later, is equally applied to the magnitude of expansion measured when these same bars were subjected to steam and autoclave treatment.

In addition to the foregoing, a comparison of Concrete Mixture No. 19 (freshly ground and commercially burned expansive cement) in Tables 31 and 32 with Concrete Mixture Nos. 6 through 8 (laboratory ground and burned in a small laboratory kiln) in Tables 10 and 11, shows that the extended burning time and mixing of the former composition has resulted in an improved homogeniety and reactivity of clinker minerals, particularly free lime and periclase crystallites, so that the additional expansion obtained due to steam treatment and autoclaving the concrete made with a commercially burned expansive cement was significantly less than that obtained from the steam treatment and autoclaving of concrete made with a laboratory produced expansive cement of the subject invention. In both cases, however, the expansions and percent grab measured by the 5 × 14 × 37 inch slab technique were superior to those obtained from concrete specimens prepared with expansive compositions not prepared by the methods of the subject invention described herein.

While the invention has been described in relation to its preferred embodiments, it is to be understood that various modifications thereof will now be apparent to one skilled in the art upon reading this specification and it is intended to cover such modifications as fall within the scope of the appended claims.

We claim:

1. An expansive cement composition made of argillaceous and calcareous materials and containing from about 1 to about 70% by weight thereof of free CaO and from about 2 to about 7% by weight thereof of MgO uniformly distributed therein, with the remaining portion of said materials being primarily tricalcium silicate and containing substantially no dicalcium silicate.

2. The expansive cement composition of claim 1 wherein said MgO exists in the form of a solid solution and of crystal particles, and wherein at least 75% of said crystal particles are no larger than about 10 microns.

3. The expansive cement composition of claim 1 having a particle size no larger than about 80 mesh (Tyler) and a fineness no greater than about 4700 cm$^2$/gm.

4. The expansive cement composition of claim 3 having from about 5 to about 30% by weight thereof of free CaO.

5. The expansive cement composition of claim 3 having a particle size that passes 100 mesh (Tyler) and a fineness no greater than 3700 cm$^2$/gm.

6. The expansive cement composition of claim 5 having a fineness between about 2000 and 3700 cm$^2$/gm.

7. An expansive cement composition made by burning mixtures of magnesia supplying materials and argillaceous and calcareous reactant materials containing an excess of CaO relative to silica under conditions to thereby convert substantially all of the silica into tricalcium silicate and uniformly distribute said magnesia in said composition, said composition containing from about 1 to about 70% by weight of free CaO and from about 2 to about 7% by weight of MgO with the remaining portion being primarily tricalcium silicate and containing substantially no dicalcium silicate.

8. The expansive cement composition of claim 7 further comprising a liquid phase which forms during the burning thereof which is in the range of from about 15 to about 35% by weight of said composition.

9. The expansive cement composition of claim 8 wherein said magnesia is present in said composition in solid solution in said liquid phase and the silicate phase thereof and in crystals wherein at least about 75% of the crystals have a size no larger than about 10 microns.

10. The expansive cement composition of claim 7 having a particle size no larger than about 80 mesh (Tyler) and a fineness no greater than about 4700 cm$^2$gm.

11. The expansive cement composition of claim 10 containing from about 5 to about 30% by weight of free CaO.

12. The expansive cement composition of claim 10 containing from about 5 to less than about 40% by weight of free CaO.

13. The expansive cement composition of claim 10 having a particle size that passes 100 mesh (Tyler) and a fineness no greater than 3700 cm$^2$/gm.

14. The expansive cement composition of claim 13 having a fineness of between 2000 and 3700 cm$^2$/gm.

15. An expansive cement composition made by burning mixtures of magnesia supplying materials and argillaceous and calcareous reactive materials containing an excess of CaO relative to silica and burned under conditions to thereby convert substantially all of the silica into tricalcium silicate, and uniformly distribute MgO therewithin, said composition containing from about 1 to about 70% by weight thereof of free CaO and a minor but effective amount of MgO which is sufficient to increase the ability of the resulting composition when hydrating to grab steel reinforcement members therewithin, and the remaining portion of said composition being primarily tricalcium silicate and containing substantially no dicalcium silicate.

16. An expansive cement comprising a mixture of:
   a. a hydratable cement; and
   b. an expansive composition made from argillaceous and calcareous materials and containing from about 1 to about 70% by weight of free CaO, and from about 2 to about 7% by weight thereof of MgO uniformly distributed therein, with the remaining portion being primarily tricalcium silicate and containing substantially no dicalcium silicate.

17. The expansive cement of claim 16 wherein said hydratable cement is Portland cement.

18. The expansive cement of claim 17 wherein said mixture is made by intergrinding a Portland cement clinker and a clinker of said expansive cement composition.

19. The expansive cement of claim 16 wherein said expansive composition contains from about 5 to less than about 40% by weight of CaO.

20. The expansive cement of claim 19 wherein said expansive composition contains from about 5 to about 30% by weight of CaO.

21. The expansive cement of claim 16 wherein said expansive composition has a particle size no larger than about 80 mesh (Tyler) and a fineness no greater than about 4700 cm$^2$/gm.

22. The expansive cement of claim 21 wherein said expansive composition has a particle size that passes 100 mesh (Tyler) and a fineness no greater than 3700 cm$^2$/gm.

23. The expansive cement of claim 22 wherein said expansive composition has a fineness of between 2000 and 3700 cm$^2$/gm.

24. The expansive cement of claim 16 containing from about 1 to about 99% by weight thereof of Portland cement and from about 99 to about 1% by weight thereof of said expansive composition.

25. The expansive cement of claim 24 wherein said expansive composition contains from about 5 to less than about 40% by weight of said free CaO.

26. The expansive cement of claim 25 wherein said expansive composition contains from about 5 to about 30% by weight of said free CaO.

27. The expansive cement of claim 16 wherein said hydratable cement is a pozzolanic cement.

28. A method of producing an expansive cement composition comprising:
 a. introducing magnesia supplying materials and argillaceous and calcareous reactant materials to the feed end of a kiln, said calcareous reactant materials containing sufficient CaO forming materials to completely react with the argillaceous materials in the kiln and to provide an excess of unreacted CaO in the burned clinker in the range of from about 1 to about 70% by weight thereof, said magnesia supplying materials supplying said MgO in an amount in the range of from about 2 to about 7% by weight of said composition;
 b. burning said materials in a burning zone in said kiln at a temperature in the range of from about 2500° F to about 2900° F and for a sufficient time to convert substantially all of the silicate in said argillaceous materials to tricalcium silicate and yield substantially no dicalcium silicate, but yield from about 1 to about 70 weight percent of free CaO in the resulting burned clinker, and to uniformly disperse said MgO in the resulting burned clinker; and
 c. grinding said clinker to produce a powdered hydraulic expansive cement composition.

29. The method of claim 28 wherein said magnesia supplying materials and said argillaceous and calcareous reactant materials fed to said kiln have a particle size such that no less than about 97% thereof passes through a 50 mesh (Tyler) screen, and no less than about 80% thereof passes through a 200 mesh (Tyler) screen.

30. The method of claim 28 wherein a liquid phase forms during said burning of said materials and is in the range of from about 15 to about 35 percent by weight of said resulting burned clinker.

31. The method of claim 30 wherein said burning results in said MgO being uniformly distributed throughout said composition in the form of a solid solution and in the form of crystals and wherein at least 75% of said crystals have a size of no more than about 10 microns.

32. The method of claim 31 wherein said grinding yields particles having a size no larger than about 80 mesh (Tyler) and a fineness no greater than about 4700 cm$^2$/gm.

33. The method of claim 32 wherein said free CaO is present in said composition in the range from about 5 to less than about 40% by weight thereof.

34. The method of claim 33 wherein said CaO is present in said composition in an amount in the range of from about 5 to about 30% by weight thereof.

35. The method of claim 33 wherein said clinker is ground to a particle size that passes 100 mesh (Tyler) and a fineness no greater than 3700 cm$^2$/gm.

36. The method of claim 35 wherein said clinker is ground to a fineness of between 2000 and 3700 cm$^2$/gm.

* * * * *

UNITED STATES PATENT AND TRADEMARK OFFICE
CERTIFICATE OF CORRECTION

PATENT NO. : 4,002,483
DATED : January 11, 1977
INVENTOR(S) : Kenneth E. Daugherty, et al.

It is certified that error appears in the above-identified patent and that said Letters Patent are hereby corrected as shown below:

Col. 9, line 43, "concreate" should be --concrete--.
Col. 10, line 7, "as" should be --was--.
Col. 12, lines 12 & 13, "analysis" should be --analyses--.
Col. 14, line 40, "stream" should be --steam--;
    lines 45 and 46, "results are set" should be --results are as set--.
Col. 15, line 17, "preference" should be --presence--;
    line 55, "2650°F." should be --2650°F to 2700°F.--.
Col. 16, line 23, "slump 5½" should be --slump of 5-1/2--.
Col. 17, lines 28 and 29, "becomes significant" should be --becomes more significant--.
Col. 27, line 4, "5x14 " inch" should be --5x14x37 inch --.

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*